(12) United States Patent
Kahn et al.

(10) Patent No.: US 8,027,255 B2
(45) Date of Patent: Sep. 27, 2011

(54) METHOD AND APPARATUS FOR PRIORITIZING PACKETS FOR USE IN MANAGING PACKETS IN RADIO ACCESS NETWORKS

(75) Inventors: Colin Kahn, Morris Plains, NJ (US); Philip Lamoureux, Succasunna, NJ (US); Jorge Rodriguez, Mountain Lakes, NJ (US); Anil Sawkar, Basking Ridge, NJ (US)

(73) Assignee: Alcatel Lucent, Paris (FR)

( * ) Notice: Subject to any disclaimer, the term of this patent is extended or adjusted under 35 U.S.C. 154(b) by 331 days.

(21) Appl. No.: 12/242,120

(22) Filed: Sep. 30, 2008

(65) Prior Publication Data

US 2010/0080153 A1    Apr. 1, 2010

(51) Int. Cl.
*H04L 12/26* (2006.01)
(52) U.S. Cl. ..................... 370/230.1; 370/236
(58) Field of Classification Search .................. 370/230, 370/230.1, 235, 236
See application file for complete search history.

(56) References Cited

U.S. PATENT DOCUMENTS

| | | | |
|---|---|---|---|
| 6,538,989 B1 | 3/2003 | Carter et al. |
| 6,788,646 B1 | 9/2004 | Fodor et al. |
| 2003/0039246 A1 | 2/2003 | Guo et al. |
| 2003/0235171 A1 | 12/2003 | Lundstrom et al. |
| 2004/0141462 A1 | 7/2004 | Mistry et al. |
| 2005/0094618 A1 | 5/2005 | Colban et al. |
| 2005/0111462 A1 | 5/2005 | Walton et al. |
| 2005/0237969 A1 | 10/2005 | Jung et al. |
| 2005/0249114 A1 | 11/2005 | Mangin et al. |
| 2005/0265363 A1 | 12/2005 | Chen |
| 2006/0098645 A1 | 5/2006 | Walkin |
| 2006/0126509 A1 | 6/2006 | Abi-Nassif et al. |
| 2006/0239188 A1 | 10/2006 | Weiss et al. |
| 2006/0268689 A1 | 11/2006 | Tarraf et al. |

(Continued)

FOREIGN PATENT DOCUMENTS

DE    10 2005 035 237 A1    3/2007

(Continued)

OTHER PUBLICATIONS

K. Ramakrishnan et al., "The Addition of Explicit Congestion Notification (ECN) to IP," RFC 3168, Standards Track, Sep. 2001, http://www.ietf.org/rfc/rfc3168.txt.

(Continued)

*Primary Examiner* — Melvin Marcelo
(74) *Attorney, Agent, or Firm* — Wall & Tong, LLP (57) ABSTRACT

The invention includes a method and apparatus adapted for managing packets within a Radio Access Network (RAN). A method includes receiving a packet within the RAN, determining a packet priority assigned to the packet, and managing the packet within the RAN based on the packet priority of the packet and a condition of the RAN. The packet priority assigned to the packet is based on at least one characteristic of the packet, which is determined based on packet contents of the packet. The at least one characteristic associated with the packet comprises information available at or above the network layer. The packet priority may be assigned to the packet within the RAN and/or outside of the RAN. The management of the packet within the RAN may include managing assignment of RAN resources to the packet (e.g., processor resources, radio resources, and the like), directing an access device to use a proscribed resource allocation, managing scheduling of the packet for transmission over the air interface of the RAN, and the like, as well as various combinations thereof.

26 Claims, 5 Drawing Sheets

U.S. PATENT DOCUMENTS

| | | |
|---|---|---|
| 2006/0268908 A1 | 11/2006 | Wang et al. |
| 2007/0153695 A1 | 7/2007 | Gholmieh et al. |
| 2007/0195788 A1 | 8/2007 | Vasamsetti |
| 2007/0207818 A1 | 9/2007 | Rosenberg et al. |
| 2008/0005572 A1 | 1/2008 | Moskowitz |
| 2008/0089237 A1* | 4/2008 | Molen et al. .......... 370/252 |
| 2009/0083144 A1 | 3/2009 | Menditto et al. |
| 2009/0225655 A1* | 9/2009 | Ray et al. .......... 370/231 |
| 2009/0252148 A1* | 10/2009 | Dolganow et al. .......... 370/351 |
| 2009/0285099 A1 | 11/2009 | Kahn et al. |
| 2009/0296613 A1* | 12/2009 | Kahn et al. .......... 370/310 |
| 2009/0300153 A1* | 12/2009 | Ray et al. .......... 709/223 |
| 2010/0080123 A1 | 4/2010 | Kahn et al. |

FOREIGN PATENT DOCUMENTS

EP    1 304 831 A2    4/2003

OTHER PUBLICATIONS

F. Chang and J. Ren, "Validating System Properties Exhibited in Execution Traces," ASE'07, Nov. 4-9, 2007, Atlanta, Georgia.

International Search Report and The Written Opinion of the International Searching Authority, Or the Declaration, in PCT/US2009/003269, Alcatel-Lucent USA Inc., Applicant, dated Nov. 2, 2009, 12 pages.

* cited by examiner

METHOD AND APPARATUS FOR PRIORITIZING PACKETS FOR USE IN MANAGING PACKETS IN RADIO ACCESS NETWORKS

FIELD OF THE INVENTION

The invention relates to the field of communication networks and, more specifically, to prioritization of packets in Radio Access Networks (RANs).

BACKGROUND OF THE INVENTION

In existing wireless communication networks, there exists a division of functions between network elements of the core network (CN) and network elements of the radio access network (RAN). The network elements of the CN provide functions and services which may be utilized by mobile nodes (MNs) which access the wireless communication network via the RAN. The network elements of the RAN operate to transmit and receive packets to and from the MNs over the air interface. While existing RANs currently support service classes, including Conversational (e.g., VoIP, push-to-talk, and the like), Best Effort (BE) and Background, existing RANs do not currently support sub-classes within these service classes. Rather, existing wireless networks provide quality-of-service treatment for packet flows based on directives from network elements within the CN, thereby preventing tailoring of quality-of-service treatment to conditions within the RAN.

SUMMARY OF THE INVENTION

Various deficiencies in the prior art are addressed through a method and apparatus adapted for managing packets within a Radio Access Network (RAN). A method includes receiving a packet within the RAN, determining a packet priority assigned to the packet, and managing the packet within the RAN based on the packet priority of the packet and a condition of the RAN. The packet priority assigned to the packet is based on at least one characteristic of the packet, which is determined based on packet contents of the packet. The at least one characteristic associated with the packet comprises information at or above the network layer. The packet priority may be assigned to the packet within the RAN and/or outside of the RAN. The management of the packet within the RAN may include managing assignment of RAN resources to the packet (e.g., processor resources, radio resources, and the like), directing an access device to use a proscribed resource allocation, managing scheduling of the packet for transmission over the air interface of the RAN, and the like, as well as various combinations thereof.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

A packet prioritization capability adapted for prioritizing packets within a Radio Access Network (RAN) is depicted and described herein. The packet prioritization capability enables prioritization of packets within a RAN, and, thus, enables intelligent management of packets within the RAN. The packet prioritization capability enables prioritization within packet flows and across packet flows.

Figure 1:
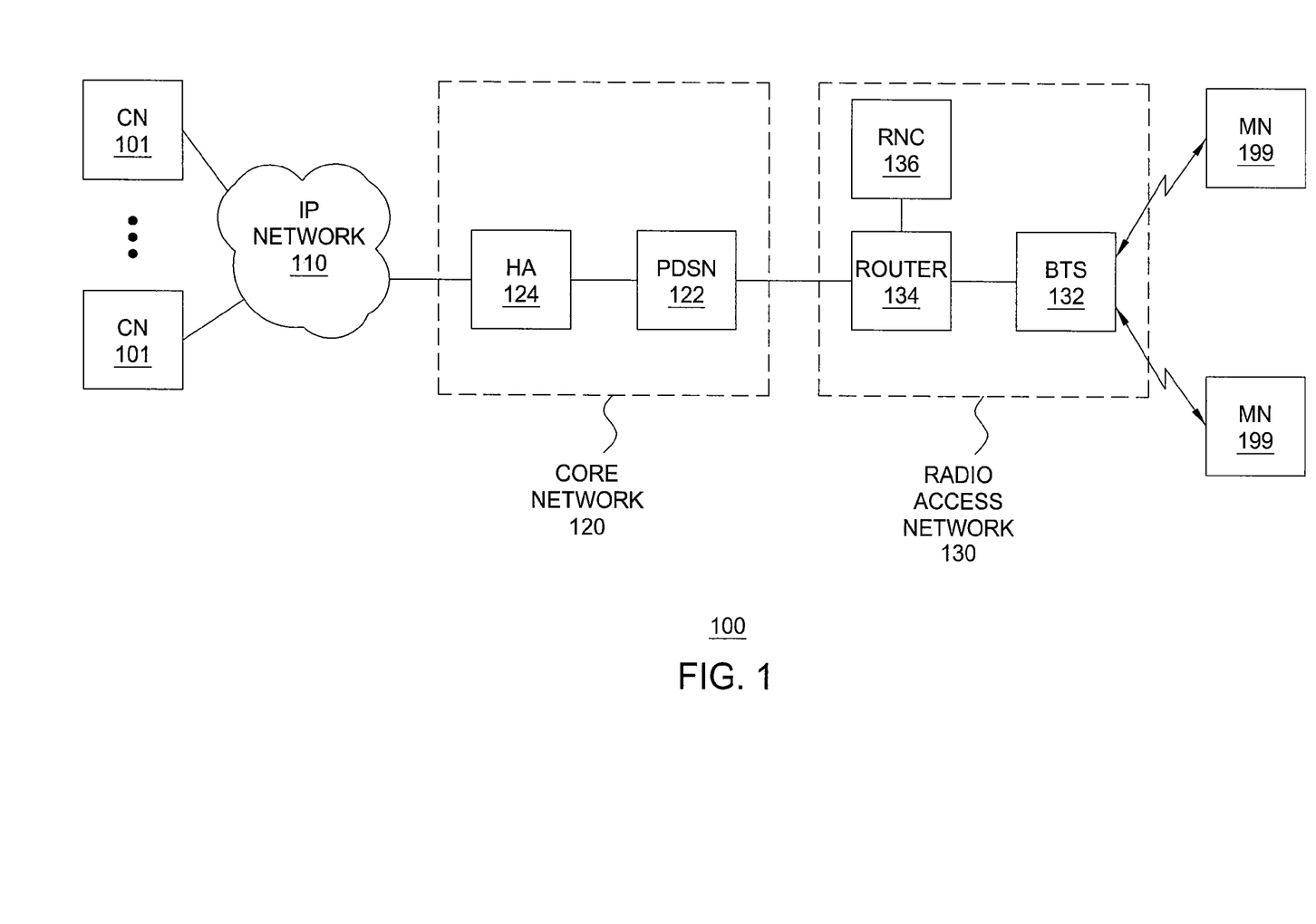
FIG. 1 depicts a high-level block diagram of a communication network including a core network (CN) and a radio access network (RAN)

FIG. 1 depicts a high-level block diagram of a communication network. Specifically, communication network 100 of FIG. 1 includes an IP network 110, a core network (CN) 120, and a radio access network (RAN) 130. The IP network 110 facilitates communications from/to correspondent nodes (CNs) 101. The IP network 110 communicates with CN 120. The RAN 130 supports wireless communications to/from mobile nodes (MNs) 199. The RAN 130 communicates with CN 120. The CN 120 facilitates communications between IP network 110 and RAN 130 and, thus, between CNs 101 and MNs 199.

The IP network 110 may include any IP network or combination of interconnected IP networks, such as one or more Intranets, the Internet, and the like, as well as various combinations thereof. Although represented as an IP network, IP network 110 may encompass various other types of packet networks.

The CN 120 is a core network. As depicted in FIG. 1, CN 120 includes a home agent (HA) 122 and a packet data serving node (PDSN) 124. The HA 124 operates as a mobility anchor. The HA 124 operates as a gateway between CN 120 and IP network 110. The PDSN 122 operates as a gateway between CN 120 and RAN 130. The CN 120 includes various other network elements adapted for providing various other functions, services, and the like (each of which is omitted for purposes of clarity).

The RAN 130 is a radio access network, providing an air interface for mobile nodes. As depicted in FIG. 1, RAN 130 includes a Base Transceiver Station (BTS) 132, a router 134, and a Radio Network Controller (RNC) 136. The MNs 199 and BTS 132 communicate wirelessly. The router 134 supports communications between the BTS 132 and the RNC 136. The router 134 also supports communications between the RAN 130 and the CN 120. As depicted in FIG. 1, router 134 supports backhaul between RAN 130 and CN 120 via PDSN 122.

The IP network 110, CN 120, and RAN 130 facilitate communications between CNs 101 and MNs 199.

The CNs 101 include nodes with which MNs 199 may communicate. The CNs 101 may be stationary and/or mobile. For example, CNs 101 may include phones (e.g., wired VoIP phones, wireless mobile phones, and the like), servers, and the like. For example, the CNs 101 may include Disney servers providing Disney content, CBS News servers providing CBS News content, or any other servers adapted for serving MNs 199. In other words, CNs 101 may include any nodes with which MNs 199 may communicate to exchange information.

The MNs 199 include wireless nodes which have wireless network connectivity via RAN 130. For example, MNs 199 may include nodes such as cell phones, personal digital assistants (PDAs), computers, and the like.

The examples of CNs 101 and MNs 199 provided herein are merely for illustrative purposes and, therefore, the proprietary information signaling functions depicted and described herein are not intended to be limited by such examples.

As described herein, communication network 100 enables intelligent management of packets within RAN 130 based on the prioritization of packets within RAN 130.

The communication network 100 supports a Packet Prioritization Function, which assigns packet priorities to packets based on one or more characteristics associated with the packet contents of the packets, where the packet contents of the packet may include payload and/or header information. The Packet Prioritization Function may be performed outside RAN 130 and/or inside RAN 130.

The communication network 100 supports a RAN Packet Management Function, which manages handling of packets within RAN 130 based on the packet priorities assigned to the packets by the Packet Prioritization Function. The RAN Packet Management Function may operate at the packet level and/or the flow level.

Figure 2:
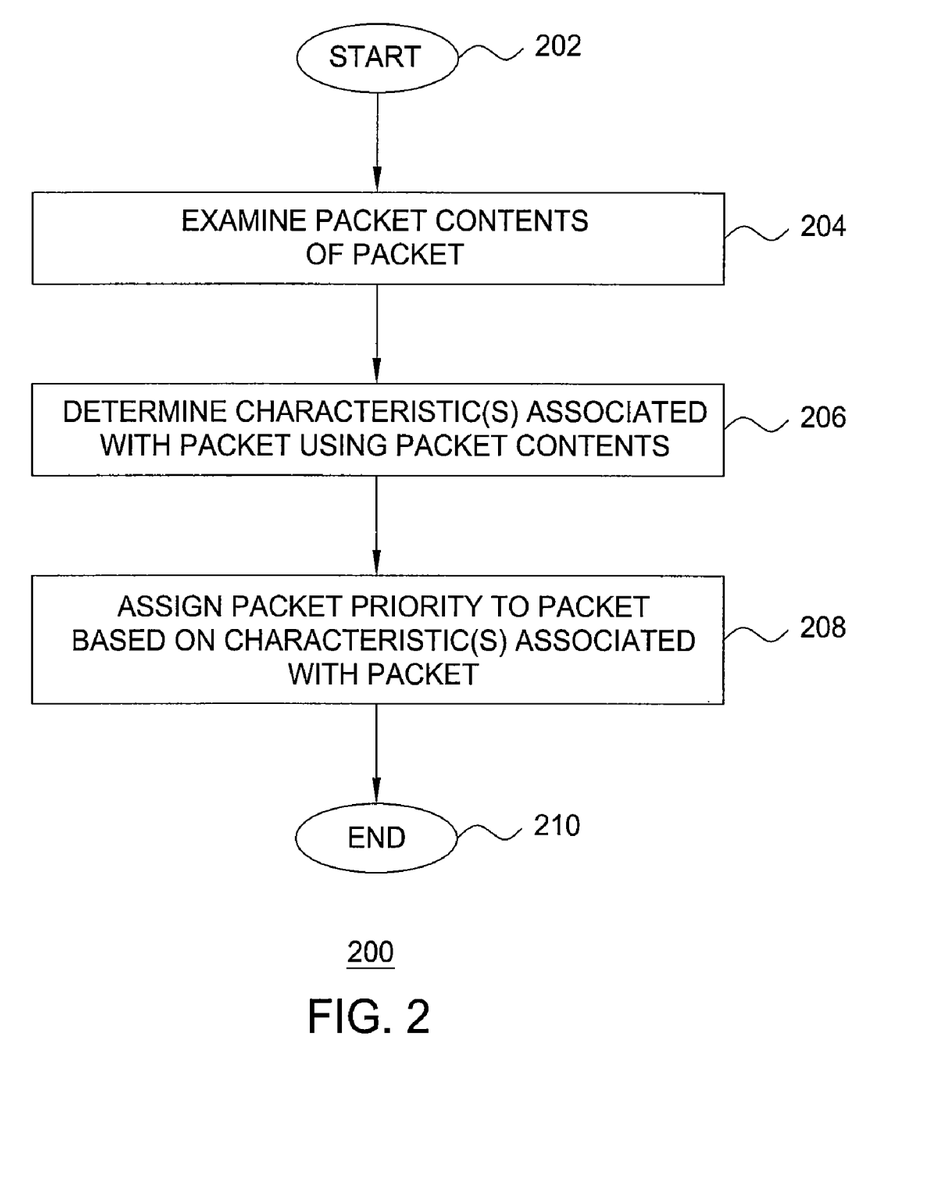
FIG. 2 depicts a high-level block diagram of one embodiment of a method for assigning a priority to a packet for use in managing the packet within a RAN.
Figure 3:
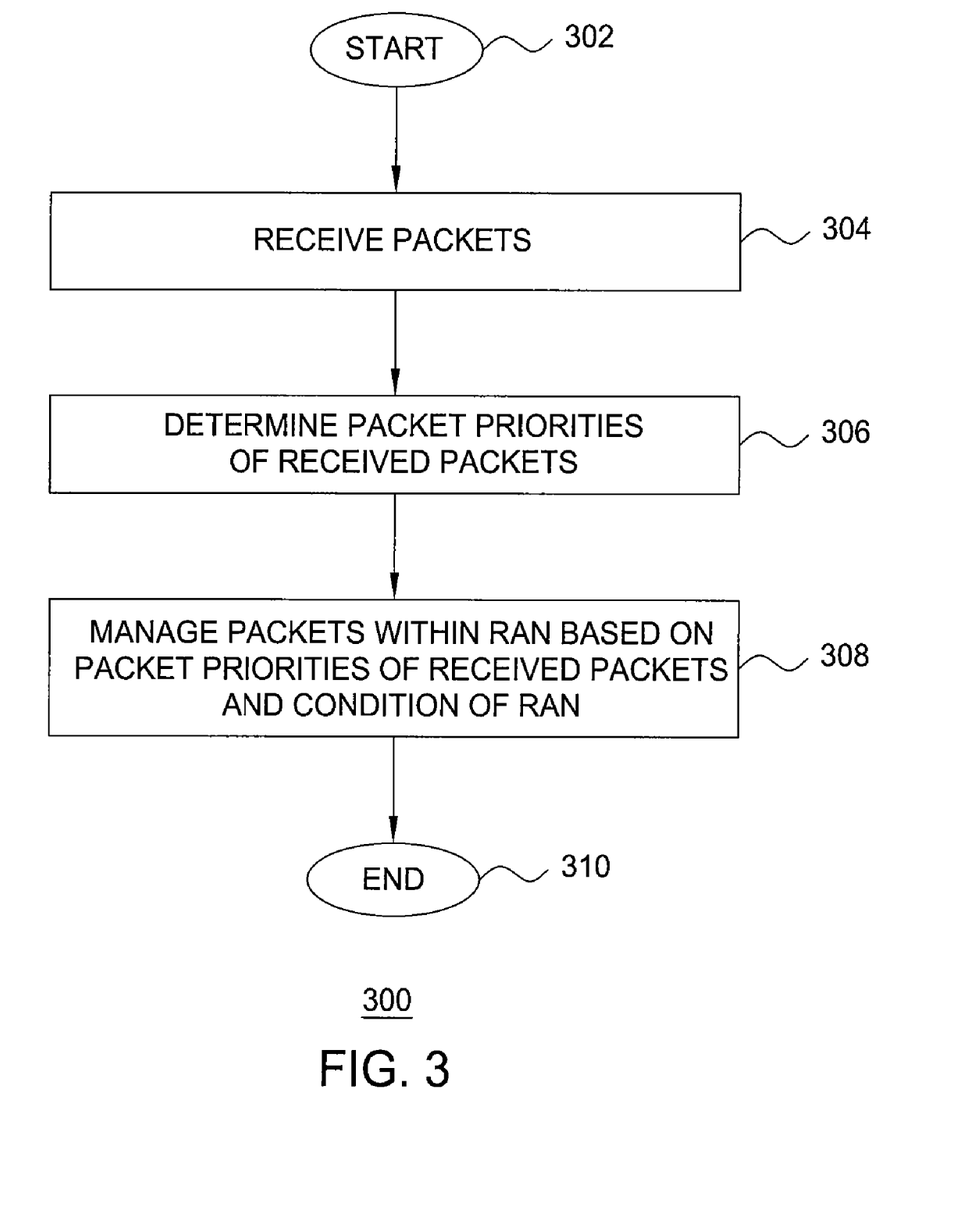
FIG. 3 depicts a high-level block diagram of one embodiment of a method for managing packets within a RAN based on priorities of the packets.
Figure 4:
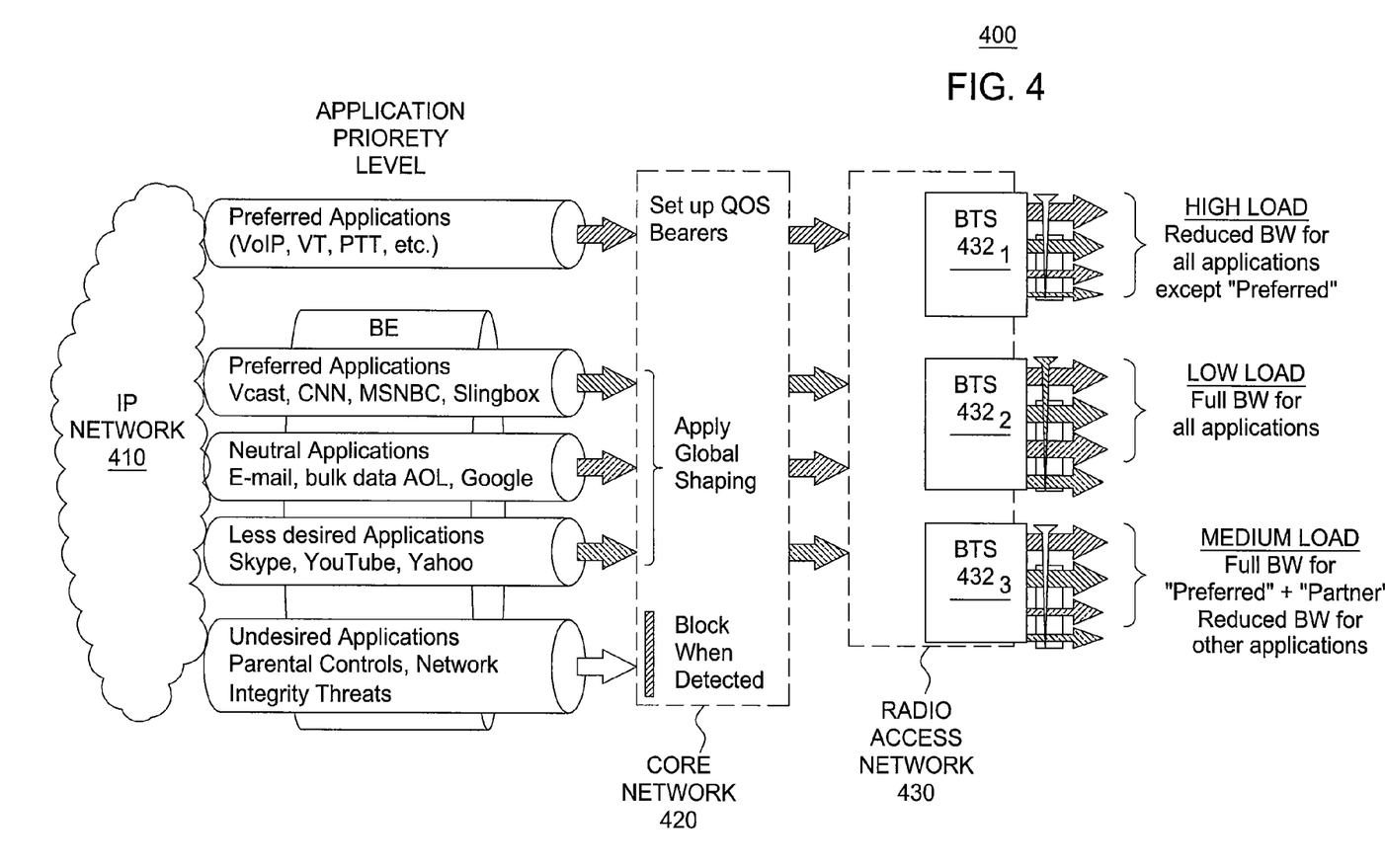
FIG. 4 depicts a high-level block diagram of an example illustrating the management of packets at multiple cell sites within a RAN.

The operation of communication network 100 in providing intelligent packet management functions may be better understood with respect to FIG. 2-FIG. 4.

FIG. 2 depicts a method according to one embodiment of the present invention. Specifically, method 200 of FIG. 2 includes a method for assigning a priority to a packet for use in managing the packet within a RAN. Although primarily depicted and described herein as being performed serially, at least a portion of the steps of method 200 may be performed contemporaneously, or in a different order than depicted and described with respect to FIG. 2. The method 200 begins at step 202 and proceeds to step 204.

At step 204, the packet contents of the packet are examined. The packet contents may include header information and/or payload information. The packet contents may include any information below, at, and/or above the network layer (i.e., information associated with the packet that is at one or more of the network layer, transport layer, session layer, presentation layer, or application layer). The packet contents may be examined in any manner suitable for examining such information. For example, the packet contents may be examined using header processing of the packet header, deep packet inspection of the packet payload, and the like, as well as various combinations thereof.

For example, packet contents of a packet may include information such as a source address of the packet, a destination address of the packet, the type of information included in the payload of the packet (e.g., data, voice, video, and the like), information about the information included in the payload of the packet, and the like, as well as various combinations thereof. The packet contents of a packet may include any other information which may be determined by examining the packet and which may be used to determine one or more characteristics of the packet.

The packet contents may be examined within the RAN and/or outside of the RAN (e.g., within the CN and/or by one or more other networks associated with the CN).

At step 206, at least one characteristic associated with the packet is determined. The at least one characteristic associated with the packet may be determined using information included within the packet (e.g., information obtained from examination of the packet, such as packet contents of the packet determined using header examination, deep packet inspection, and the like) and/or from information not obtained from examination of the packet.

The at least one characteristic is at or above the network layer (i.e., information associated with the packet that is at one or more of the network layer, transport layer, session layer, presentation layer, or application layer). This information may be referred to herein as higher-layer information. This information also may be referred to in terms of the pieces of information associated with the packet and derived from the information contained in the packet (referred to as characteristics of the packet contents).

For example, characteristics of the packet contents of a packet may include one or more of a type of application associated with the packet (e.g., VoIP, e-mail, streaming video, and the like), a specific application associated with the packet (e.g., Skype, YouTube, Slingbox, and the like), a source of the packet, a destination of the packet, a provider associated with the packet, a subscriber associated with the packet, a device type of the device for which the packet is intended, a capability of the device for which the packet is intended, and like characteristics which may be determined from the contents of the packet, as well as various combinations thereof.

The characteristic(s) associated with the packet may be determined from the packet contents of the packet in a number of ways.

For example, examination of packet contents of a packet may result in identification of a source IP address of the packet which may be used to determine the content provider server from which the packet originated. For example, examination of packet contents of a packet may result in a determination that the packet is conveying packetized voice, which may be used to determine the type of device for which the packet is intended.

The manner in which the characteristic(s) associated with the packet contents of a packet may be determined may vary depending on one or more factors, such as the type of characteristic(s) being determined, the network element(s) determining the characteristic(s), and the like, as well as various combinations thereof.

For example, where the characteristic to be determined for a packet is the type of application of the packet, the specific application of the packet, or any other similar characteristic, the packet contents used to determine the characteristic may be determined using deep packet inspection. For example, deep packet inspection may be performed by one or more of HA 124, PDSN 122, router 134, and the like.

For example, where the characteristic to be determined for a packet is the source/destination of the packet flow, the provider associated with the packet flow, or any other similar characteristic, the packet contents used to determine the characteristic may be determined by examining the header of the packet. For example, header examination may be performed by one or more of HA 124, PDSN 122, router 134, and the like.

For example, where the characteristic to be determined for a packet is a device type of a device for which the packet is intended, a device capability of a device for which the packet is intended, a subscriber attribute of the subscriber for which the packet is intended, or any other similar characteristic, the characteristic may be determined using information stored in a profile(s) that is selected based on examination of the packet contents. For example, profile information may be available from an Authentication, Authorization, and Accounting (AAA) server or any other source of such information.

The at least one characteristic which forms the basis for assigning a packet priority to a packet may be based on any other information associated with the packet contents and/or determined in various other ways.

The characteristic(s) associated with the packet may be determined within the RAN and/or outside of the RAN (e.g., within the CN and/or by one or more other networks associated with the CN).

At step 208, the priority is assigned to the packet based on the at least one determined characteristic associated with the packet. The assignment of a packet priority to the packet based on characteristic(s) associated with the packet may be performed in a number of ways.

The packet priority may be assigned to the packet within the RAN and/or outside of the RAN. In an embodiment in which the packet priority is assigned to the packet within the CN, the packet priority may be assigned using one or more policies of the service provider of the CN. In an embodiment in which the packet priority is assigned to the packet within the RAN, the packet priority may be assigned using one or more policies of the service provider of the RAN.

At step 210, method 200 ends. Although depicted and described as ending (for purposes of clarity), it will be noted that execution of method 200 ensures that the RAN is ultimately aware of the packet priority of the packet and, thus, may utilize packet priorities of received packets in order to manage the packets within RAN. A method by which a RAN may manage packets based on associated packet priority is depicted and described with respect to FIG. 3.

The steps of examining packet contents of a packet, determining at least one characteristic associated with the packet based on the packet contents of the content, and assigning a priority to the packet based on the characteristic(s) of the packet may be implemented in various other ways, some of which are described hereinbelow. For example, the locations within the wireless communications network at which the steps of method 200 of FIG. 2 are performed may be selected in many different ways.

In one embodiment, packet contents of a packet are examined outside of the RAN (e.g., in the CN and/or a network associated with the CN).

In one such embodiment in which packet contents of a packet are examined outside of the RAN, the packet contents of the packet may be signaled to the RAN, which may then determine characteristic(s) of the packet based on the packet contents, and, further, which may assign a packet priority to the packet based on the determined characteristic(s) of the packet. The packet contents may be signaled to the RAN by the CN. The packet contents of the packet may be signaled to the RAN in any manner suitable for signaling such information.

For example, one or more nodes of CN 120 (e.g., HA 124, PDSN 122, or other nodes of the CN 120) may examine the packet to determine the packet contents. The CN 120 may then signal an indication of the packet contents to RAN 130. For example, the router 134 of RAN 130 may receive signaling indicative of the packet contents of a packet from CN 120 (e.g., routed to the router 134 via PDSN 122 of CN 120). The handling of the packet contents within the RAN 130 to assign the packet priority to the packet may then be performed in a number of ways.

In continuation of the present example, as an example, the router 134 may then determine the characteristic(s) associated with the packet based on the packet contents, assign the packet priority to the packet based on the characteristic(s), and then signal the packet priority of the packet to one or more other nodes of the RAN 130 (e.g., to a control node such as RNC 136 and/or radio access node such as BTS 132).

In continuation of the present example, as another example, the router 134 may then determine the characteristic(s) associated with the packet based on the packet contents, and signal the characteristic(s) of the packet to one or more other nodes of the RAN, which may then assign the packet priority to the packet based on the characteristic(s) (e.g., to a control node such as RNC 136 and/or a radio access node such as BTS 132).

In continuation of the present example, as another example, the router 134 may simply forward the packet contents of the packet to one or more other nodes of the RAN, which may then determine the characteristic(s) associated with the packet based on the packet contents and assign the packet priority to the packet based on the characteristic(s) (e.g., providing the packet contents to RNC 136, which determines the characteristic(s) of the packet, assigns the packet priority to the packet based on characteristic(s) of the packet, and then signal the packet priority to BTS 132).

In another such embodiment in which packet contents of a packet are examined outside of the RAN, the characteristics(s) of the packet also may be determined outside of the RAN (e.g., in the CN and/or a network associated with the CN). The characteristics(s) of the packet may then be signaled to the RAN, which may assign a packet priority to the packet based on the received characteristic(s) of the packet.

For example, HA 124, PDSN 122, and/or other nodes of CN 120 may determine the characteristic(s) associated with the packet using the packet contents of the packet, and signal an indication of the characteristic(s) of the packet to one or more of RNC 136, router 134, and BTS 132 of RAN 130 for use by such elements to assign the packet priority to the packet.

As an example, a mobility anchor node of the RAN (e.g., HA 124 of CN 120) may examine the packet contents of the packet and determine one or more characteristics associated with the packet based on the packet contents (where the HA 124 may obtain the packet contents examining the packet to determine the packet contents and/or by receiving the packet contents from one or more other nodes within the CN 120 or within networks associated with the CN 120). The HA 124 may then signal the characteristics associated with the packet to the RAN 130 via a mobility gateway node of CN 120 (e.g., the PDSN 124). The RAN 130 then assigns a packet priority to the packet based on the characteristic(s) of the packet.

In another such embodiment in which packet contents of a packet are examined outside of the RAN, the characteristics(s) of the packet also may be determined outside of the RAN and, further, the packet priority of the packet may be assigned to the packet outside of the RAN (e.g., in the CN and/or a network associated with the CN). The packet priority of the packet may then be signaled to the RAN.

For example, a mobility anchor node of the RAN (e.g., the HA 124) may examine the packet contents of the packet and determine one or more characteristics associated with the packet based on the packet contents (where the HA 124 may obtain the packet contents examining the packet to determine the packet contents and/or by receiving the packet contents from one or more other nodes within the CN 120 or within networks associated with the CN 120). The HA may then assign a packet priority to the packet and signal the packet priority to the RAN 130 via a mobility gateway node of the CN (e.g., PDSN 124).

In one embodiment, the packet contents of a packet are examined within the RAN, the one or more characteristics associated with the packet based on the packet contents are determined within the RAN, and the packet priority is assigned to the packet within the RAN using the characteristic(s) of the packet. In such embodiments, these functions may be performed by one or more routers, control nodes, or other nodes of the RAN.

In one embodiment, packet contents of a packet are examined within the RAN. In one such embodiment, one or more network elements of the RAN may examine packet contents of the packet to determine one or more characteristics of the packet contents which may be used to assign the packet priority to the packet. For example, one or more of RNC 136, router 134, and BTS 132 may perform header processing, deep packet inspection, or other processing on a packet to obtain packet contents of the packet which may be used to determine one or more characteristics of the packet contents which may be used to assign the packet priority to the packet. The network element of the RAN 130 which examines packet contents of the packet may determine the packet priority to assign to the packet using determined characteristic(s) of the packet and/or provide the determined characteristic(s) of the packet to one or more other nodes of RAN 130 which may then determine the packet priority to be assigned to the packet based on determined characteristic(s) of the packet.

In one such embodiment, for example, the characteristic(s) associated with the packet, and the packet priority to be assigned to the packet based on the characteristic(s) of the packet, are determined by router 134. The packet priority to be assigned to the packet based on the characteristic(s) of the packet contents may be determined locally (e.g., using packet prioritization information available on router 134) and/or remotely (e.g., by sending the packet and the characteristics based on the contents information to one or more other network elements, inside or outside of RAN 130) and using the determined characteristic(s) of the packet in order to determine the packet priority to be applied to the packet). In this embodiment, router 134 signals the packet contents and/or an indication of the packet priority of the packet to one or more network elements within RAN 130 (i.e., to the network element(s) within RAN 130 that manage packets within RAN 130, such as BTS 132 and/or RNC 136). The router 134 may signal the packet priority or contents of the packet in any manner (e.g., using one or more header fields, using one or more header extensions, using an existing signaling framework of RAN 130, and the like, as well as various combinations thereof).

In another such embodiment, for example, the characteristic(s) associated with the packet contents is determined by router 134 and the packet priority that is to be assigned to the packet based on the characteristic(s) of the packet contents is determined by one or more other network elements within RAN 130 (e.g., a network element(s) within RAN 130 adapted for managing packets within the RAN 130, such as BTS 132 and/or RNC 136). In this embodiment, router 134 signals the characteristic(s) associated with the packet contents to one or more other network elements within RAN 130 adapted for managing packets within the RAN 130 for use by the other network element(s) in determining the packet priority of the packet using the characteristic(s) associated with the packet.

The information associated with assignment of packet priorities to respective packets (i.e., packet contents determined via packet examination, characteristic(s) of the packet determined based on the packet contents, and the packet priority assigned to the packet) may be signaled in various ways. For example, the information may be signaled in-band (i.e., within the packet for which the priority is being assigned) and/or out-of-band. For example, the information may be signaled using one or more of existing packet header fields, packet header extensions, and the like, as various combinations thereof. Thus, the RAN packet management functions depicted and described herein are not intended to be limited to any particular means by which the RAN may become aware of the packet priorities assigned to respective packets for use in managing the packets within the RAN.

The packet prioritization functions depicted and described herein may support any number of packet priority levels, which may depend on the level of granularity desired in managing packets within the RAN.

In one embodiment, the packet priority of a packet is determined using one or more packet prioritization policies (which may be referred to herein as service provider policies). The packet prioritization policies may be policies of the service provider operating the CN (e.g., where packet priority is assigned to the packet within the CN). The packet prioritization policies may be policies of the service provider operating the RAN (e.g., where the packet priority is assigned within the RAN, where the packet priority is assigned within the CN and the service provider that is operating the CN has access to the packet prioritization policies of the RAN, and the like, as well as various combinations thereof).

In one embodiment, the priority of a packet is determined by applying the characteristic(s) of the packet to one or more packet prioritization policies in order to determine which policy or policies should be applied to the packet. The policies may specify the packet priority level to be applied to the packet based on the characteristic(s) of the packet.

In one embodiment, one or more network elements (i.e., the network elements(s) responsible for determining the packet priorities of packets, which may include network elements within the RAN 130 and/or outside of the RAN 130) may be provisioned with packet prioritization policy information adapted to enable determination of which packet priority should be assigned to a packet based on one or more characteristics of the packet contents.

In one embodiment, for example, one or more network elements may be provisioned with a packet prioritization policy lookup table including packet prioritization policy information by which a packet priority that should be assigned to a packet is determined using one or more characteristics of the packet contents. In one such embodiment, for example, characteristic(s) of the packet contents may be used as a key into the packet prioritization policy lookup table. For example, the table may include a characteristic(s) field and an associated packet prioritization policy field such that the characteristic(s) of the packet may be used to determine the packet priority to be assigned to the packet. The packet prioritization information may be maintained in various other ways (e.g., using different numbers/types of fields within a table, using a different number of tables, using means other than tables, and the like, as well as various combinations thereof).

The packet prioritization policy provisioned for a characteristic or set of characteristics may be determined in any manner. The packet prioritization policy may be derived from any source. For example, the packet prioritization policy applied for a given characteristic(s) of a packet may be based on one or more of business agreements, service level agreements, and the like, which may be established between different providers (e.g., such as between content providers and service providers, between service providers and network providers, and the like). For example, the packet prioritization policy applied for a given characteristic(s) of a packet may be based on service contracts between providers and subscribers (e.g., where a subscriber may subscribe to a higher level of service for a larger fee). The packet prioritization policy applied for a given characteristic(s) of a packet may be derived from any other source of such information.

The packet prioritization policy information may be provisioned in the network in any manner. The packet prioritization policy information may be provisioned periodically and/or aperiodically. The packet prioritization policy information may be provisioned automatically (e.g., using configuration files automatically downloaded to HA 124, router 134, RNC 136, and the like) and/or manually (e.g., by one or more network administrators using one or more management systems). The packet prioritization policy information also may be updated in the network in any manner. The packet prioritization policy information may be updated for any reason. The packet prioritization policy information may be provisioned and/or updated in the network in any other manner, as long as the packet prioritization policy information is available for use in determining which packet priority should be assigned to a packet based on characteristic(s) of the packet as determined from its contents.

The packet prioritization policy information for a packet prioritization policy may include any information adapted to enable application of the packet prioritization policy to packets determined to have a characteristic or set of characteristics.

In one embodiment, for example, packet prioritization policy information for a packet prioritization policy includes a value indicative of a priority level to be assigned to packets having the characteristic(s) associated with the packet prioritization policy. The packet prioritization policy also may include one or more other parameters which may (1) further define the priority level of the packet prioritization policy and/or (2) provide an additional level of granularity within the priority level of the packet prioritization policy. For example, the additional parameters may include one or more of a bandwidth requirement, a data rate requirement, an air-interface scheduling weight, and the like, as well as various combinations thereof. The packet prioritization policy information for a packet prioritization policy may include any other information which may be used to prioritize packets within a RAN.

In one embodiment, the supported packet prioritization policies provide packet priority differentiation within a Best Effort (BE) service class. In one such embodiment, packet priority differentiation is provided within the BE service class by supporting multiple different priority levels within the BE service class. In this manner, within a RAN, non-QoS-aware applications that are sensitive to QoS metrics (e.g., packetized voice, streaming video, and the like) may be prioritized over applications that are not sensitive to QoS metrics (e.g., such as FTP downloads, e-mail delivery, and the like). The manner in which applications may be prioritized with respect to each other may be better understood with respect to the example of FIG. 4.

Although primarily described with respect to embodiments in which there is a one-to-one correspondence between packet prioritization policies and packet priority levels, any numbers and/or types of packet priority levels may be supported using any numbers and/or types of packet prioritization policies. The packet prioritization capability depicted and described herein is not intended to be limited by implementation of packet prioritization policies, packet priority levels, or other implementation details; rather, as long as RAN 130 is aware of packet priorities of packets, RAN 130 can manage packets within RAN 130.

As an example, consider an embodiment in which three different packet priority levels are supported within the BE service class (e.g., high priority, medium priority, and low priority).

In this example, examination of a packet may result in identification of a destination IP address which is used to determine that the packet originates from a Verizon Wireless VCAST server. The determination that the packet originates from a Verizon Wireless VCAST server may cause the packet priority of the packet to be set to the high priority level (e.g., where Verizon has a service level agreement with the network provider to receive high priority treatment for video streamed from its servers over the RAN 130).

In this example, examination of a packet may result in identification of information from the packet which is used to determine that the packet is conveying streaming video from YouTube. The determination that the packet is conveying streaming video from YouTube may cause the packet priority of the packet to be set to the low priority level (e.g., where YouTube has not entered into an agreement with the network provider to receive any priority treatment for videos streamed from its servers over RAN 130).

In this example, examination of a packet may result in identification of information from the packet which is used to determine that the packet is providing packetized voice for an voice session supported by Skype. The determination that the packet is providing packetized voice for a voice session supported by Skype may cause the packet priority of the packet to be set to the medium priority level (e.g., where Skype has a service level agreement with the network provider to receive medium priority treatment for voice sessions over RAN 130, but is not willing to pay a higher premium for high priority treatment).

Thus, regardless of the embodiment or combination of embodiments employed, the RAN 130 is ultimately aware of the packet priority of the packet and, thus, may utilize packet priorities of received packets in order to manage the packets within RAN 130 (e.g., for use by BTS 132 and/or RNC 136 to manage packets within RAN 130). The manner in which RAN 130 is made aware of the packet priority of a packet may dictate the manner in which the packet priority of the packet is communicated within RAN 130.

In one embodiment, the packet priority is provided to RNC 136 (i.e., where the packet priority is not determined by RNC 136), which may perform packet management for the packet based on the packet priority of the packet and/or signal BTS 132 with an indication of the packet priority assigned to the packet so that BTS 132 may perform packet management for the packet based on the packet priority of the packet.

In one embodiment, the packet priority is provided to BTS 132 (i.e., where the packet priority is not determined by BTS 132), which may perform packet management for the packet based on the packet priority of the packet. The packet priority may be provided to BTS 132 in any manner (e.g., directly from router 134, indirectly by RNC 136 via router 134, and the like).

In one embodiment, in which RNC 136 signals the packet priority of the packet to BTS 132, RNC 136 may signal the packet priority to BTS 132 in any manner. In one such embodiment, for example, RNC 136 implicitly signals BTS 132 using the packets of the packet flow. As one example, values indicative of the packet priority of the packet, which were previously inserted into the packet, remain in the packet for propagation to BTS 132 via router 134. As another example, values indicative of the packet priority of the packet are inserted into the packet by RNC 136 (e.g., using information received in the packet, based on a determination of the packet priority of the packet by RNC 136, based on a packet priority of the packet which is provided to RNC 136, and the like, as well as various combinations thereof). In another such embodiment, for example, RNC 136 explicitly signals BTS 132 with an indication of the packet priority of a packet (e.g., using an existing signaling framework of RAN 130). The RNC 136 may signal the packet priority of the packet to BTS 132 in other ways.

A method by which RAN 130 may use packet priorities of packets for managing the packets within RAN 130 is depicted and described with respect to FIG. 3.

FIG. 3 depicts a method according to one embodiment of the present invention. Specifically, method 300 of FIG. 3 includes a method for managing packets within a RAN based on respective packet priorities assigned to the packets. Although primarily depicted and described herein as being performed serially, at least a portion of the steps of method 300 may be performed contemporaneously, or in a different order than depicted and described with respect to FIG. 3. The method 300 begins at step 302 and proceeds to step 304.

At step 304, packets are received at the RAN (e.g., at a control node, radio access node(s), and/or other nodes of the RAN which may manage packets within the RAN using respective packet priorities of the packets). The packets may include packets of one or more packet flows. The packets are associated with one or more applications, including at least one application normally associated with a best effort (BE) service class of the RAN.

At step 306, packet priorities of the packets are determined. The packet priorities of the packets may be determined from the packets and/or from a source other than the packets (e.g., where the packet priorities of the packets are provided to the radio access node in a different way).

The packet priorities of the packets enable handling of the packets within the RAN based on their relative values (i.e., packet priorities), thereby enabling intelligent management of packets within the RAN. As described herein, the packet priority of a packet is determined based on one or more characteristics associated with the packets, where characteristic(s) associated with the packet are determined based on packet contents of the packets and, optionally, associated information.

At step 308, the packets are managed within the RAN based on the packet priorities of the packets and a condition of the RAN.

The condition of the RAN may be determined periodically and/or aperiodically. The condition of the RAN may be monitored continuously.

The condition of the RAN may be specified on a per-cell-site basis. For example, in a CDMA EV-DO RAN, the condition of the RAN may be specified for each BTS in the RAN. For example, in a UMTS-based RAN, the condition of the RAN may be specified for each Node B in the RAN.

The condition of the RAN may include one or more of a congestion status of the RAN or portion(s) of the RAN, an indication of radio frequency fluctuations within the RAN or portion(s) of the RAN, an indication of mobility status of the RAN or portion(s) of the RAN, and the like, as well as various combinations thereof. The condition of the RAN may include any other types of RAN status information which may be used to specify the condition of the RAN.

The management of packets within the RAN based on packet priorities of the packets and conditions within the RAN may include one or more of managing allocation of RAN resources for handling the packets within the RAN (e.g., processor resources, radio resources, and the like), directing an access device to use a proscribed resource allocation, scheduling transmission of the packets over an air interface(s) of the RAN, and the like, as well as various combinations thereof.

The management of packets within the RAN may be performed in a number of ways.

In one embodiment, packet management may be performed at a control node of the RAN (e.g., in the example of FIG. 1, at RNC 136). For example, RNC 136 may apply bandwidth filters to the packets in order to police the packets according to the associated packet priorities of the packets. The RNC 136 may apply any other packet management techniques which may be applied by within the RAN.

In one embodiment, packet management may be performed at a radio access node of the RAN (e.g., in the example of FIG. 1, at BTS 132). For example, BTS 132 may assign resources to packets based on the assigned packet priorities of the packets, BTS 132 may schedule transmission of packets based on the assigned packet priorities of the packets, and the like, as well as various combinations thereof.

In one embodiment, management of the packets within the RAN is performed on a per-cell-site basis based on the respective conditions of the cell sites.

The management of packets within the RAN based on packet priorities of the packets and conditions within the RAN may be better understood with respect to the example of FIG. 4.

At step 310, method 300 ends. Although depicted and described as ending (for purposes of clarity), it will be understood that method 300 may continue to be performed in order to optimize handling of packets within the RAN based on assigned priorities and conditions within the RAN.

FIG. 4 depicts a high-level block diagram of an example illustrating the management of packets at multiple cell sites within a radio access network. As depicted in FIG. 4, a wireless communication network 400 includes an IP network 410, a core network (CN) 420, and a radio access network (RAN) 430. The IP network 410, CN 420, and RAN 430 of FIG. 4 are similar to the IP network 110, CN 120, and RAN 130 of FIG. 1, respectively; however, RAN 430 is different than RAN 130 in that RAN 430 includes three cell sites, represented as BTS 432$_1$, BTS 432$_2$, and BTS 432$_3$ (respectively, BTSs 432).

As depicted in FIG. 4, packets of packet flows are propagated from IP network 410 into RAN 430 via CN 420 (e.g., from a HA to a PDSN within CN 420, and then to BTSs 432). The packet flows originate from correspondent nodes served by IP network 410. The packet flows are intended for mobile nodes that access wireless communication network 400 via RAN 430.

As depicted in FIG. 4, the packet flows are associated with different applications, and the packet flows are prioritized into a plurality of packet flow priority levels based on information associated with the packet flows, such as the type of application of the packet flow, the specific application of the packet flow, and the like, as well as various combinations thereof.

In the example, of FIG. 4, five different packet flow priority levels are supported.

A first of the packet flow priority levels is denoted as "Preferred Applications", which include QoS-aware applications which are handled above the Best Effort (BE) service class. In the example of FIG. 4, the "Preferred Applications" priority level includes packet flows supporting applications types such as VoIP, VT, PTT, and the like.

The four other packet flow priority levels include priority levels defined within the Best Effort (BE) service class, including (from highest priority level to lowest priority level): a "Partner Applications" priority level, a "Neutral Applications" priority level, a "Less-Desired Applications" priority level, and an "Undesired Applications" priority level. In the example of FIG. 4, the different priority levels within the BE service class include packet flows supporting application types and/or applications. The "Partner Applications" priority level includes packet flows supporting applications such as Verizon VCAST, CNN, MSNBC and Slingbox. The "Neutral Applications" priority level includes packet flows supporting application types and applications such as e-mail, bulk data, AOL, and Google. The "Less-Desired Applications" priority level includes packet flows supporting applications such as Skype, YouTube, and Yahoo. The prioritization scheme of FIG. 4 is for illustrative purposes only.

In the example of FIG. 4, each of the cell sites served by BTSs 432 has a congestion level associated therewith. In FIG. 4, the widths of the lines in RAN 430 (where the lines represent the different application priority levels supported in this example) is meant to represent the amount of bandwidth allocated for the packet flows of the respective application priority levels.

The BTS $432_1$ is experiencing high load and, as a result, BTS $432_1$ reduces the bandwidth available for all packet flows with the exception of packet flows of "Preferred Applications" priority level. This is indicated in FIG. 4, illustratively, by a reduction in the width of the lines which represent packet flows of the "Partner Applications" priority level, the "Neutral Applications" priority level, the "Less-Desired Applications" priority level, and the "Undesired Applications" priority level.

The BTS $432_2$ is experiencing low load and, as a result, BTS $432_2$ allocates full bandwidth each of the application priority levels. This is indicated in FIG. 4, illustratively, keeping the widths of the lines which represent the packet flows of the application priority levels unchanged.

The BTS $432_3$ is experiencing medium load and, as a result, BTS $432_3$ reduces the bandwidth available for all packet flows with the exception of packet flows of the "Preferred Applications" priority level and the "Partner Applications" priority level. This is indicated in FIG. 4, illustratively, by a reduction in the width of the lines which represent packet flows of the "Neutral Applications" priority level, the "Less-Desired Applications" priority level, and the "Undesired Applications" priority level.

In this manner, when ample resource are available within specific cell sites of the RAN, all packets will receive the necessary resources to provide the quality-of-experience that is appropriate for the quality-of-service class with which the packets are associated; and when resources within specific cell sites of the RAN are constrained, priority will be given to packets based on the assigned packet priorities.

In existing wireless communications networks (i.e., ones incapable of performing the RAN-based packet management functions depicted and described herein), each cell site exhibits the same traffic characteristics as the other cells sites, independent of the actual conditions associated with the cell sites. As a result, in existing wireless communications networks, the quality-of-experience of subscribers on non-congested cells would be degraded, even though the non-congested cell should be able to provide better quality-of-experience in the absence of congestion.

By contrast, as seen at least from the example of FIG. 4, in wireless communication networks that are adapted to perform the RAN-based packet management functions depicted and described herein, dynamic RAN traffic shaping occurs only in cell sites in which it is needed due to conditions in the cell sites (e.g., due to localized congestion). This enables optimization of the quality-of-experience across all of the cell sites of the RAN without requiring additional resources. This also minimizes the amount of packet management (e.g., policing/shaping) that must be performed in the CN because congestion is now locally managed at the radio access nodes where it occurs. The only packet management that must be performed in the CN is that which a service provider wishes to apply globally. This enables the service provider to support high rate applications without any concern that the high rate applications may cause congestion that will adversely affect low rate applications that have high economic value.

The prioritization of packets across packet flows provides service differentiation. Using the packet prioritization functions depicted and described herein, service provider policies may be enforced to provide higher or lower grades of service based on higher layer information (e.g., type of application, specific application, content provider, and the like, as described herein). The assignment of packet priorities to packets can account for localized variations in air interface capacity, congestion, and other conditions which exist within the RAN, thereby enabling RAN resources to be allocated according to the economic value of the packets (i.e., the packet priorities of the packets which are assigned based on service provider policies).

The prioritization of packets within a packet flow provides optimization of the packet flow, thereby enabling the RAN to determine which of the packets of the packet flow are most important to the quality-of-experience of the subscriber of the packet flow such that more important packets of the packet flow may be given priority over less important packets of the packet flow.

The packet prioritization functions depicted and described herein will enable multiplication of traffic within the RAN for many different types of wireless communications networks (e.g., LTE, EV-DO, UMTS, and the like, as described herein) because wireless service providers will no longer fear that high-bandwidth/low-value applications will disrupt the service to high-value applications serviced within the BE service class or other service classes.

Although primarily depicted and described herein with respect to providing packet prioritization in a CDMA-based network (more specifically, an CDMA EV-D-based network), the packet prioritization functions depicted and described herein may be utilized for providing packet prioritization in other types of wireless communications networks. For example, packet prioritization functions depicted and described herein may be utilized for providing packet prioritization in other types of CDMA-based wireless communication networks, in Universal Mobile for Telecommunications (UMTS)-based wireless communication networks, in Worldwide Interoperability for Microwave Access (WiMAX)-based wireless communication networks, and the like.

In a UMTS-based RAN, functions described herein as being performed by RNC 136 may be performed by a Radio Network Controller and functions described herein as being performed by BTS 132 may be performed by a NodeB. Similarly, in a WiMAX network, functions described herein as being performed by RNC 136 may be performed by an Access Service Network-Gateway (ASN-GW) and functions described herein as being performed by BTS 132 may be performed by a base station. Thus, RNC 136 and BTS 132 may be referred to more generically as a controller and a radio access node, respectively.

In a UMTS-based wireless communication network, functions described herein as being performed by PDSN 122 may be performed by a combination of Serving GPRS support node (SGSN) and a GPRS Gateway Support Node (GGSN). In other types of wireless communications networks (e.g., WiMAX, LTE, and the like), functions described herein as being performed by HA 124 and/or PDSN 122 may be performed by other similar nodes which may be used to provide similar functions in such networks.

Although primarily depicted and described herein with respect to IP packets, the packet prioritization functions depicted and described herein may be utilized for prioritizing packets in RANs that convey information using other types of packets. In such embodiments, packet priorities may be marked in the packets in any manner supported by the type of packet for which quality-of-service policy indicators must be marked.

Figure 5:
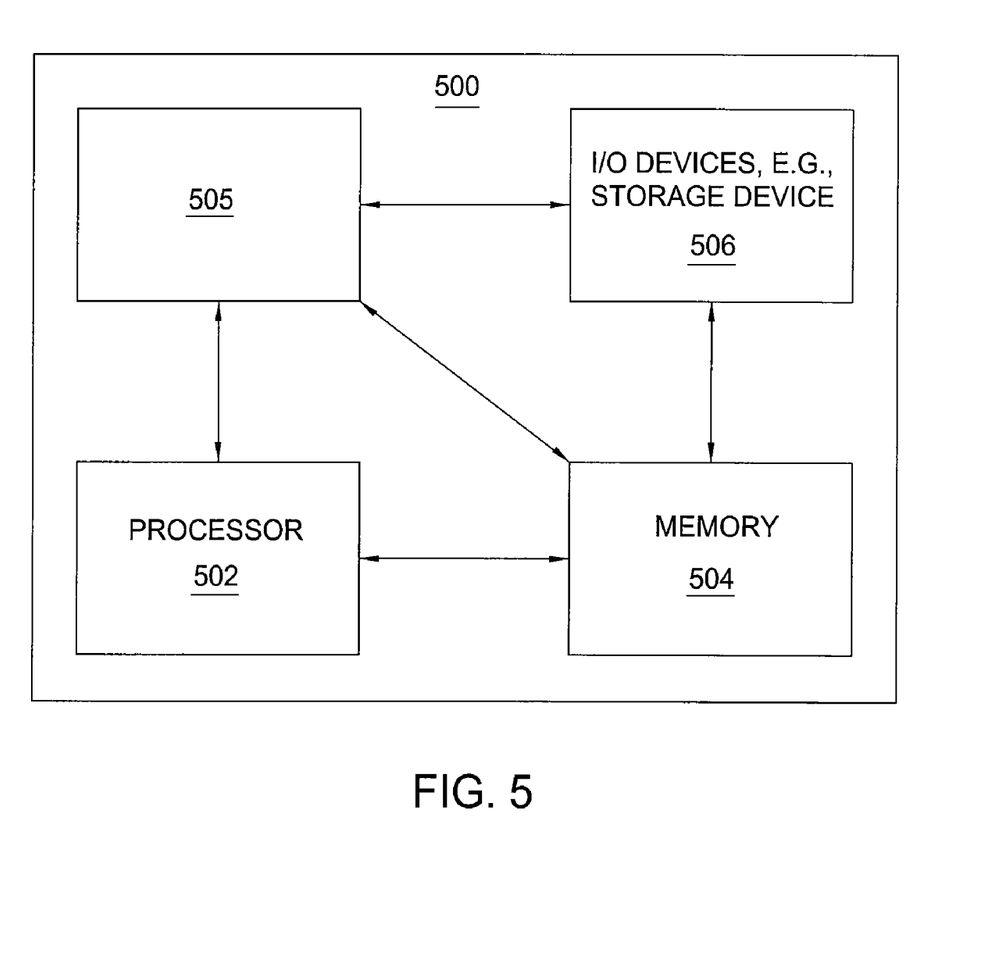
FIG. 5 depicts a high-level block diagram of a general-purpose computer suitable for use in performing the functions described herein.

FIG. 5 depicts a high-level block diagram of a general-purpose computer suitable for use in performing the functions described herein. As depicted in FIG. 5, system 500 comprises a processor element 502 (e.g., a CPU), a memory 504, e.g., random access memory (RAM) and/or read only memory (ROM), a packet management module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the packet management process 505 can be loaded into memory 504 and executed by processor 502 to implement the functions as discussed above. As such packet management process 505 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus for managing packets within a radio access network (RAN), comprising:
a processor configured for:
  receiving, at a wireless access node, a packet intended for transmission via an air interface of the wireless access node;
  determining a packet priority associated with the packet, wherein the packet priority associated with the packet is based on at least one characteristic associated with the packet, wherein the at least one characteristic associated with the packet comprises information at or above the network layer; and
  managing transmission of the packet via the air interface of the wireless access node based on the packet priority of the packet and a condition of a cell site associated with the wireless access node.

2. The apparatus of claim 1, wherein the packet priority of the packet is determined using one of at least one header field of the packet and at least one header extension of the packet.

3. The method apparatus of claim 1, wherein the packet priority is associated with the packet inside of the RAN, or is associated with the packet outside of the RAN and signaled to the RAN.

4. The apparatus of claim 1, wherein the packet priority is associated with the packet using at least one packet prioritization policy.

5. The apparatus of claim 1, wherein the packet priority associated with the packet is associated with one of a plurality of quality-of-service levels supported by the RAN.

6. The apparatus of claim 5, wherein the plurality of quality-of-service levels are associated with a plurality of service classes.

7. The apparatus of claim 6, wherein the plurality of service classes comprises a Preferred service class and a Best Effort service class.

8. The apparatus of claim 7, wherein one of the quality-of-service levels is associated with the Preferred service class, wherein at least two other of the quality-of-service levels are associated with the Best Effort service class.

9. The apparatus of claim 1, wherein the at least one characteristic associated with the packet is determined based on packet contents of the packet.

10. The apparatus of claim 9, wherein the packet contents of the packet comprise at least one of header information of the packet and payload information of the packet.

11. The apparatus of claim 1, wherein the at least one characteristic of the packet comprises at least one of a type of application associated with the packet, an application associated with the packet, a source of the packet, a destination of the packet, a provider associated with the packet, a subscriber associated with the packet, and a device type of a device for which the packet is intended, and a capability of a device for which the packet is intended.

12. The apparatus of claim 1, wherein the at least one characteristic of the packet is determined at least one of inside the RAN and outside the RAN.

13. The apparatus of claim 1, wherein managing transmission of the packet via the air interface of the wireless access node comprises:
scheduling transmission of the packet over the air interface of the wireless access node.

14. The apparatus of claim 1, wherein managing transmission of the packet via the air interface of the wireless access node comprises:
assigning resources of the wireless access node to the packet.

15. The apparatus of claim 1, wherein managing transmission of the packet via the air interface of the wireless access node comprises:
directing the wireless access node to use a proscribed resource allocation.

16. The apparatus of claim 1, wherein the condition of the cell site associated with the wireless access node comprises at least one of a congestion status of the cell site associated with the wireless access node, an indication of radio frequency fluctuations within the cell site associated with the wireless access node, and a mobility status of the cell site associated with the wireless access node.

17. The apparatus of claim 1, wherein the packet is associated with a packet flow, wherein the packet is managed with respect to other packets of the packet flow and independent of packets of other packet flows.

18. The apparatus of claim 1, wherein the packet is associated with a packet flow, wherein the packet is managed with respect to packets of at least one other packet flow.

19. A method for managing packets within a radio access network (RAN), comprising:
  receiving, at a wireless access node, a packet intended for transmission via an air interface of the wireless access node;
  determining a packet priority associated with the packet, wherein the packet priority associated with the packet is based on at least one characteristic associated with the packet, wherein the at least one characteristic associated with the packet comprises information at or above the network layer; and
  managing transmission of the packet via the air interface of the wireless access node based on the packet priority of the packet and a condition of a cell site associated with the wireless access node.

20. A non-transitory computer-readable medium storing instructions which, when executed by a computer, cause the computer to perform a method for managing packets within a radio access network (RAN), the method comprising:
  receiving, at a wireless access node, a packet intended for transmission via an air interface of the wireless access node;
  determining a packet priority associated with the packet, wherein the packet priority associated with the packet is based on at least one characteristic associated with the packet, wherein the at least one characteristic associated with the packet comprises information at or above the network layer; and
  managing transmission of the packet via the air interface of the wireless access node based on the packet priority of the packet and a condition of a cell site associated with the wireless access node.

21. An apparatus for managing packets within a radio access network (RAN), comprising:
  a processor configured for:
    receiving a packet at a router of the RAN;
    examining the packet at the router for determining the contents of the packet;
    determining, at the router, at least one characteristic associated with the packet using the contents of the packet, wherein the at least one characteristic associated with the packet comprises information at or above the network layer; and
    assigning, at the router, a packet priority to the packet based on the at least one characteristic associated with the packet; and
    signaling the packet and the packet priority assigned to the packet toward a wireless access node of the RAN for use by the wireless access node in managing transmission of the packet via an air interface of the wireless access node.

22. The apparatus of claim 21, wherein examination of the packet is performed using at least one of header inspection on a header of the packet and deep packet inspection on a payload of the packet.

23. The apparatus of claim 21, wherein assigning the packet priority to the packet is performed using at least one packet prioritization policy.

24. The apparatus of claim 21, wherein the packet priority associated with the packet is associated with one of a plurality of quality-of-service levels supported by the RAN.

25. The apparatus of claim 24, wherein the plurality of quality-of-service levels are associated with a plurality of service classes.

26. The apparatus of claim 25, wherein the plurality of service classes comprises a Preferred service class and a Best Effort service class, wherein one of the quality-of-service levels is associated with the Preferred service class, wherein at least two other of the quality-of-service levels are associated with the Best Effort service class.

* * * * *